(12) United States Patent
Chevalier (10) Patent No.: US 11,344,098 B2
(45) Date of Patent: May 31, 2022

(54) ARTICLE FOR DECORATING A PERSON'S SKIN OR NAIL AND METHOD USING SUCH AN ARTICLE

(71) Applicant: L V M H RECHERCHE, Saint Jean de Braye (FR)

(72) Inventor: Marc Chevalier, Franconville (FR)

(73) Assignee: L V M H RECHERCHE, Saint Jean de Braye (FR)

( * ) Notice: Subject to any disclaimer, the term of this patent is extended or adjusted under 35 U.S.C. 154(b) by 664 days.

(21) Appl. No.: 15/740,561

(22) PCT Filed: Jun. 29, 2016

(86) PCT No.: PCT/FR2016/051615
§ 371 (c)(1),
(2) Date: Dec. 28, 2017

(87) PCT Pub. No.: WO2017/001777
PCT Pub. Date: Jan. 5, 2017

(65) Prior Publication Data
US 2018/0184780 A1   Jul. 5, 2018

(30) Foreign Application Priority Data
Jun. 29, 2015   (FR) ..................... 15 56060

(51) Int. Cl.
*A45D 29/00* (2006.01)
*A44C 15/00* (2006.01)
(Continued)

(52) U.S. Cl.
CPC ........ *A45D 29/001* (2013.01); *A44C 15/0005* (2013.01); *A45D 29/00* (2013.01);
(Continued)

(58) Field of Classification Search
CPC ...... A45D 29/001; A45D 29/00; A45D 44/00; A45D 2029/005; A45D 2200/205; A44C 15/0005
See application file for complete search history.

(56) References Cited

U.S. PATENT DOCUMENTS 3,502,088 A * 3/1970 Sven ................. A61Q 3/00
                                            132/73
3,898,357 A * 8/1975 Miller ............... A61Q 3/00
                                            428/42.3
(Continued)

FOREIGN PATENT DOCUMENTS

DE   3337458 A1   4/1985
EP   2589373 A1   5/2013
(Continued)

OTHER PUBLICATIONS

International Search Report related to Application No. PCT/FR2016/051615 dated Nov. 3, 2016.
(Continued)

*Primary Examiner* — Patricia L. Nordmeyer
(74) *Attorney, Agent, or Firm* — von Briesen & Rope, s.c.

(57) ABSTRACT

The invention relates to an article comprising a decorative element to be applied to a person's skin or nail, said decorative element comprising: a decoration to be transferred to a person's skin or nail, said decoration comprising a decorative layer; a support film supporting said decoration, said support film being removably attached to a first outer surface of the decorative layer; a layer of inert adhesive which is applied to a second outer surface of the decorative layer and which can be activated by an activator, and an activator comprising a fluid, pasty, semi-pasty, or solid component which can be applied to a person's skin or nails.

23 Claims, 4 Drawing Sheets

(51) Int. Cl.
*A45D 44/00* (2006.01)
*C09J 7/30* (2018.01)
*C09J 7/32* (2018.01)
*A45D 33/38* (2006.01)

(52) U.S. Cl.
CPC ............. *A45D 33/38* (2013.01); *A45D 44/00* (2013.01); *A45D 2029/005* (2013.01); *A45D 2200/205* (2013.01); *C09J 7/30* (2018.01); *C09J 7/32* (2018.01); *C09J 2301/416* (2020.08); *Y10T 428/14* (2015.01)

(56) References Cited

U.S. PATENT DOCUMENTS

| | | | |
|---|---|---|---|
| 4,596,260 | A | 6/1986 | Giuliano |
| 5,415,903 | A * | 5/1995 | Hoffman .............. A45D 29/001 |
| | | | 428/15 |
| 6,227,206 | B1 * | 5/2001 | Sallee .................. A45D 29/001 |
| | | | 132/200 |
| 2002/0011014 | A1 | 1/2002 | Lipper |
| 2013/0032163 | A1 * | 2/2013 | Roescheisen ........ A45D 29/001 |
| | | | 132/200 |
| 2013/0153133 | A1 * | 6/2013 | Kane ..................... B44C 1/1733 |
| | | | 156/230 |

FOREIGN PATENT DOCUMENTS

| | | |
|---|---|---|
| FR | 2999063 A1 | 6/2014 |
| JP | S62194099 U | 12/1987 |
| JP | S62284605 A | 12/1987 |
| JP | H1120397 A | 1/1999 |

OTHER PUBLICATIONS

Schueller Randy; "How temporary tattoo is made—material, manufacture, used, processing, components, industry, Raw Materials", Dec. 13, 2014, XP055313596, Retrieved from the internet: URL:http://www.madehow.com/Volume-4/Temporary-Tattoo.html [retrieved on Oct. 25, 2016] the whole document.

* cited by examiner

ARTICLE FOR DECORATING A PERSON'S SKIN OR NAIL AND METHOD USING SUCH AN ARTICLE

CROSS-REFERENCE TO RELATED APPLICATION

This Application is a 35 USC § 371 US National Stage filing of International Application No. PCT/FR2016/051615 filed on Jun. 29, 2016, and claims priority under the Paris Convention to French Patent Application No. 15 56060 filed on Jun. 29, 2015.

FIELD OF THE DISCLOSURE

The invention relates to articles for decorating the human body, and in particular impermanent decorative articles to be applied to the skin or nails.

BACKGROUND OF THE DISCLOSURE

Many products exist that are intended for application to the skin or nails, in order to embellish, cover, camouflage, or show to advantage a human body part in an impermanent manner. We find such makeup in multiple forms (powder, cream, glitter flakes), packaged in bottles with or without applicators.

Temporary tattoos to apply to the skin or nails also exist. These are in the form of a decoration with predetermined contours supported by a sheet. The decoration is transferred to the skin or nails by applying the sheet to the location where one wishes to position the tattoo (the side of the sheet bearing the decoration being positioned against the skin or nail), and the outer face of the sheet is moistened in order to peel the decoration off its support for the transfer.

The invention relates in particular to decorations to be transferred to the skin or nails.

There are also "sticker" type decorations to be applied to the skin or nails: such decorations are in the form of self-adhesive images with predefined contours which must be cut to fit the shape and size of a nail for example.

The result obtained with such stickers is not always very accurate and aesthetic, for example not covering the entire surface to be decorated.

Patent application FR 2,999,063 describes an article for decorating a person's skin or nail, comprising:
a decorative element to be applied to the skin or to at least one nail of a person, said decorative element comprising a decoration to be transferred at least partially to the person's skin or nail, said decoration comprising at least one decorative layer having a first outer surface and a second outer surface and a support film supporting said decoration, said support film being releasably fixed to the first outer surface of said decorative layer. The article further comprises a fluid product applied to the skin by means of an applicator, the fluid having the characteristic of becoming sticky while drying.

Such an article does not provide accurate results, and is even capable of damaging the decoration by partially dissolving it on contact.

Document DE3337458 describes an article for decorating the skin or a nail, whose application requires a source of thermal radiation and a pressing element, which complicates its implementation.

SUMMARY OF THE DISCLOSURE

The invention aims to provide an article for decorating a person's skin or nail that enables obtaining an accurate decorative result, with no shape limitation, and that is simple to implement.

For this purpose, the invention provides an item for decorating a person's skin or nail, comprising an activator which is tolerated by a person's skin or nail and a decorative element to be applied to the skin or to at least one nail of a person, said decorative element comprising:
    a decoration to be transferred at least partially to the person's skin or nail, said decoration comprising at least one decorative layer having a first outer surface and a second outer surface,
    a support film supporting said decoration, said support film being removably attached to the first outer surface of said decorative layer,
    a layer of inert adhesive, applied to the second outer surface of said decorative layer, said activator being able to activate said layer of inert adhesive,
    characterized in that the activator comprises a component that is fluid, pasty, semi-pasty, or solid particularly powdery, which can be applied to the skin or to at least one nail of a person.

Associating a layer of inert adhesive on the decorative layer provides constant adhesion between the decoration and the inert adhesive. In this manner, when the activator is placed in contact with the adhesive, the decoration continues to adhere to the adhesive where said inert adhesive is in contact with the activator and the decoration is only transferred at the exact location where the activator was placed in contact with the adhesive. This allows obtaining precise, aesthetic transfers of the desired shape.

The article of the invention may further comprise the following features, taken separately or in combination:
    the fluid component may be a solvent for said inert adhesive;
    said solvent may comprise at least one solvent among: water, alcohol, acetate, or acetone;
    the layer of inert adhesive may comprise a first component of a two-component adhesive, and the fluid component may comprise a second component of said two-component adhesive;
    the article may comprise an applicator for a fluid, semi-fluid, or solid component.
    the activator may comprise a source of light radiation, preferably ultraviolet radiation;
    the activator may further comprise a heat-contributing source;
    the activator may further comprise a cold-contributing source;
    the activator may be a pressure source;
    said layer of inert adhesive may comprise a plurality of sublayers of products superimposed on one another;
    said decoration may be a sheet having a surface area measuring at least 0.5 cm², possibly at least 1 cm², possibly at least 10 cm²;
    alternatively, said decoration may be a sheet having a surface area measuring between 0.5 cm² and 100 cm², possibly between 10 cm² and 100 cm²;
    said decoration may be a sheet having a pattern in two or three dimensions, or providing an effect imitating three dimensions, or imitating fabric, a particle effect, a metal, or a decoration providing optical illusions according to its orientation relative to a light source;

the support film of said decorative layer may be a transparent film;

the article may comprise a removable protective film at least partially covering said layer of inert adhesive.

The invention also relates to a method for the at least partial transfer of a decoration of a decorative element of the article as defined above, wherein the activator comprises a component that is fluid, pasty, semi-pasty, or solid particularly powdery, applicable to the skin or to at least one nail of a person, said method comprising the steps of:

applying, to the skin or to a nail, the fluid, pasty, semi-pasty, or solid particularly powdery component comprised in the activator for said layer of inert adhesive, applying said decorative element to the skin or to the nail, by placing the layer of inert adhesive of the decorative element on the fluid component applied to the skin or the nail, waiting a predetermined time for activation of the adhesive, removing the decorative element.

According to a variant, the method of the invention may also be implemented with an article comprising an applicator for a fluid, semi-fluid, or solid component. According to this method, application of the fluid component is effected by means of the applicator.

According to another variant, the method may make use of an article in which the activator comprises a source of light radiation, preferably ultraviolet radiation. According to the invention, said method comprises an additional step wherein, after the step of applying said decorative element to the skin or nail, the decorative element is exposed to ultraviolet radiation for a predetermined time.

According to yet another variant of the method of the invention, after the step of applying the decorative element to the skin or to a nail, the decorative element is exposed to a heat source for a predetermined time. The heat source may produce heat of a temperature between 25° C. and 40° C.

According to yet another variant of the method of the invention, ensuring the at least partial transfer of a decoration of a decorative element of an article according to the invention wherein the activator comprises a source of light radiation, preferably ultraviolet radiation, the method comprises the steps of:

applying said decorative element to the skin or nail by placing the layer of inert adhesive of the decorative element directly on the skin or nail, exposing the decorative element, positioned on the skin or on a nail, to radiation, waiting a predetermined time for activation of the adhesive, removing the decorative element.

Preferably, in the context of this method, the radiation is thermal or light radiation.

According to yet another variant of the method of the invention, it may further comprise a step of pressing the decorative element onto the skin or onto a nail.

BRIEF DESCRIPTION OF DRAWINGS

To enable its execution, the invention is described in a sufficiently clear and comprehensive manner in the following description, which in addition is accompanied by drawings in which.

DETAILED DESCRIPTION OF THE DISCLOSURE

In the following description, the terms "lower", "upper", "top", "bottom", etc. are used in reference to the drawings, for greater ease of understanding. They are not to be understood as limiting the scope of the invention.

Figure 1:
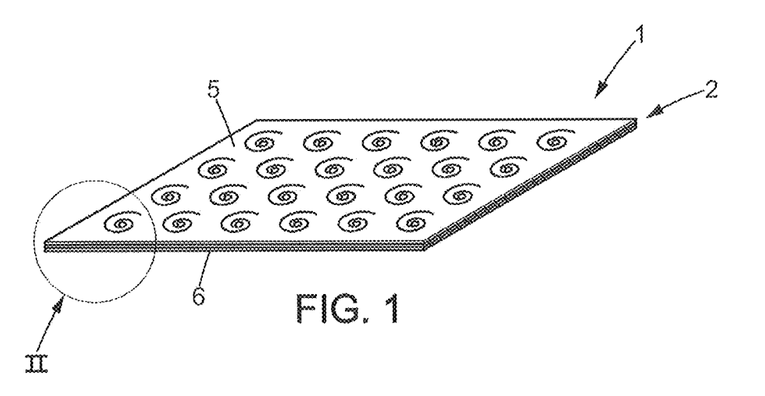
FIG. 1 is a perspective view of a decorative element of an article according to the invention.

FIG. 1 shows a decorative element 1 of an article according to the invention, which is in the form of a flexible rectangular sheet with a continuous decorative layer. The sheet has a smaller side measuring at least 10 cm, possibly at least 1 cm, possibly at least 0.1 cm. Preferably, the smaller side measures between 0.1 cm and 30 cm, possibly between 0.1 cm and 5 cm, possibly between 0.1 cm and 1 cm. This sheet preferably has a surface area measuring at least 0.5 $cm^2$, possibly at least 1 $cm^2$, possibly at least 10 $cm^2$. Preferably, the sheet has a surface area measuring between 0.5 $cm^2$ and 100 $cm^2$, possibly between 10 $cm^2$ and 100 $cm^2$. It should be understood that the sheet may have other dimensions and other forms while remaining within the scope of the invention.

Alternatively, a mounted support strip presents discontinuous decorative elements, said decorative elements having a side measuring at least 0.25 cm and a surface area measuring at least 0.06 $cm^2$. The support strip may be, for example, in the form of a strip. The decorative elements of a same support could all be identical or different.

This decorative element 1 may be rigid but generally is flexible enough to be applied on a curved or flexible surface such as a fingernail or a skin-covered human body part such as an eyelid, a shoulder, an arm, etc.

In the examples that will be presented, the decorative element is applied on a nail, an eyelid, or a shoulder. It should be understood that the invention is not restricted to an application of a decorative element on those specific areas, and that the decorative element of the invention could be applied to other parts of the human body.

Figure 2:
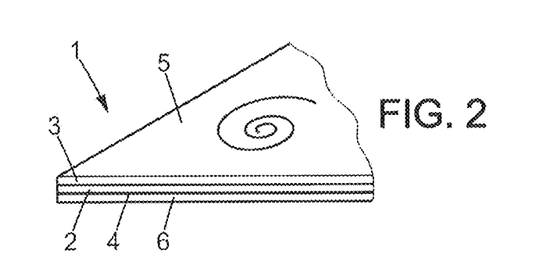
FIG. 2 is an enlargement of area II shown in FIG. 1.

As is represented in FIG. 2, the decorative element 1 is composed of several stacked layers: a first layer constitutes a decoration 2, schematically illustrated by a sheet on which spiral patterns are uniformly distributed and cover the entire surface of the decorative layer 2.

The decorative layer 2 may itself be implemented as multiple stacked layers of different colors and textures, while remaining within the scope of the invention. Thus, a transparent outer protective layer for the decoration (such as lacquer or a plastic film) may be present in the decorative layer 2.

The decorative layer 2 is a layer of decoration: it could be a printed pattern that imitates glitter, fabric, a particle effect, or it may provide a sensory effect such as the feel of velvet, or a printed pattern giving a three-dimensional effect or optical illusions according to the orientation of the decoration relative to a light source, etc., or simply a solid color.

The decorative layer 2 comprises a first outer surface 3 and a second outer surface 4.

The first outer surface 3 is removably attached to a support film 5 supporting the decorative layer. The support film 5 is transparent in this case, in order to be able to distinguish the decoration of the decorative layer 2.

It is understood that the support film 5 could be implemented as non-transparent while remaining within the scope of the invention.

The support film 5 has the function of protecting the decorative layer (during storage and to facilitate transferring the decoration) and enabling easier handling of the decorative element because it contributes a certain robustness.

According to the invention, a layer of inert adhesive 6 is applied on the entire second outer surface 4, opposite the outer surface 3 integral to the support film 5. "Inert" should be understood as meaning with no actual adhesive effect when touched.

The layer of inert adhesive 6 has the characteristic of not adhering as long as it is not brought into contact with an activator which can be of different types as will be seen below (fluid, radiation, etc.).

For example, the adhesive may be a cellulose or nitrocellulose type of polymer and the activator may be a solvent such as acetate, acetone, sucrose ester, or the activator may be one or more plasticizers (Citroflex for example).

The solvent may also comprise castor oil, for example in the context of the embodiment where the activator is in fluid form for application to a nail, because castor oil also provides treatment for nail cuticles.

The adhesive used could also have a different pH from that of the activation solvent: for example, the polymer of the adhesive could have an acid pH and the activation solvent could have a basic pH.

A cellulose-based inert adhesive could also be turned to a film by contact with a solvent comprising glutaraldehyde.

The layer of inert adhesive does not change under temperatures of up to 60° C. and in a humid atmosphere where the humidity reaches 85%.

The inert adhesive 6 may also comprise a first component of a two-component adhesive, such as silicone glue. In such a case, the activator can be a fluid comprising the second component of the two-component layer: in the example of a layer of inert adhesive comprising silicone, the second component comprised in the activator can be platinum-based (for a biotype adhesive for example such as "Pressure sensitive adhesive", known as PSA adhesive).

The layer of inert adhesive may also be entirely or partially covered by a protective removable film (not shown) so that it is protected prior to the first use of the decorative element 1.

Figure 3:
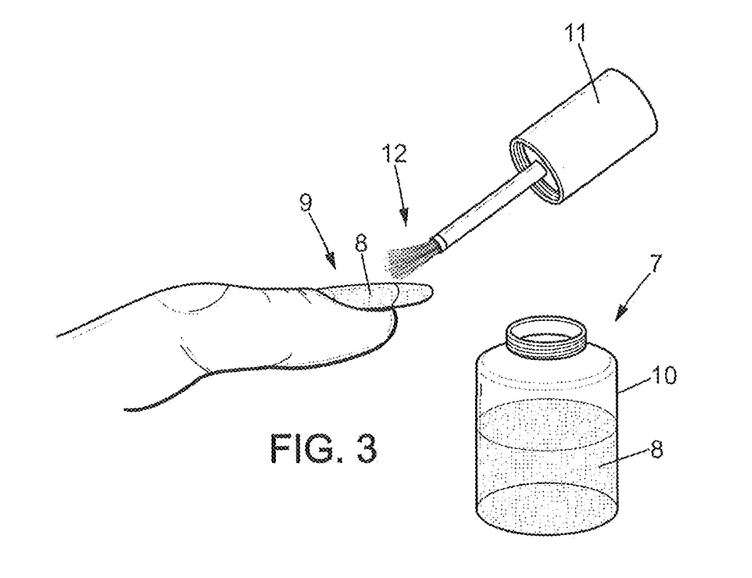
FIG. 3 is a perspective view of a bottle comprising an activator for an article according to the invention, an applicator, and a finger.

FIG. 3 shows a first example of an activator 7 in the form of a fluid 8 to be applied on a nail 9.

The activator 7 of the invention is an activator which can be tolerated by a person's skin or nails. "Activator which can be tolerated by a person's skin or nails" is understood to mean an activator that does not damage the skin or nails when it is brought into contact with the skin or nail in a temporary and non-prolonged manner (meaning no more than a few days for a fluid and a few 30 minutes for radiation). The activator is thus dermatologically compatible with the skin or nails.

The actual activator has no adhesive effect.

The fluid 8 of the activator 7 is packaged in a bottle 10 fitted with a cap 11, the cap 11 comprising an applicator 12 for the fluid 8.

The applicator 12 may be a brush for example (or any other type of applicator of a form known to the art in the field of cosmetic formula application or in any other field such as paint, food, calligraphy, etc.), the applicator 12 enabling application of the activator 7 in fluid 8 form to the nail 9 in a manner similar to nail polish.

Figure 4:
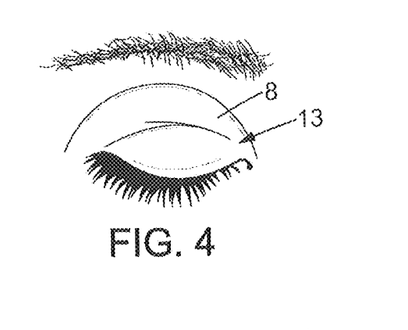
FIG. 4 is a front view of an eyelid.

The brush of the applicator 12 may also be used for precise application of the activator 7 in fluid 8 form to an eyelid 13, as shown in FIG. 4. It may also be used to apply the activator 7 while forming a pattern, drawn by the user.

It is understood that the invention is not specifically limited to the use of an applicator in the form of a brush. The applicator could be a pen, a pad, a foam, a stamp, a roller, etc., without departing from the scope of the invention.

Figure 12:
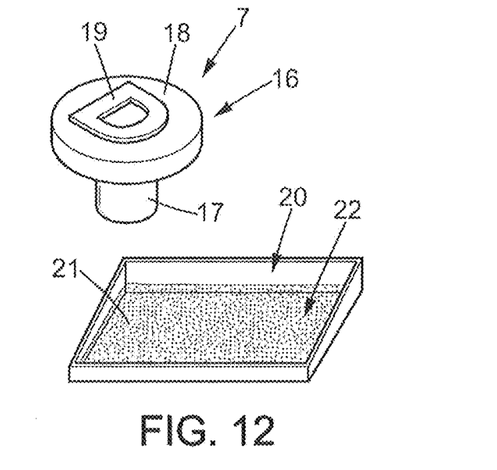
FIG. 12 is a perspective view of an applicator and an activator reservoir, the applicator being used to obtain the letter-shaped decoration shown in FIG. 11.

Another applicator is shown in FIG. 12, comprising a letter-shaped stamp and a reservoir comprising an activator. It will be described below in the context of a particular implementation of the invention.

Figure 7:
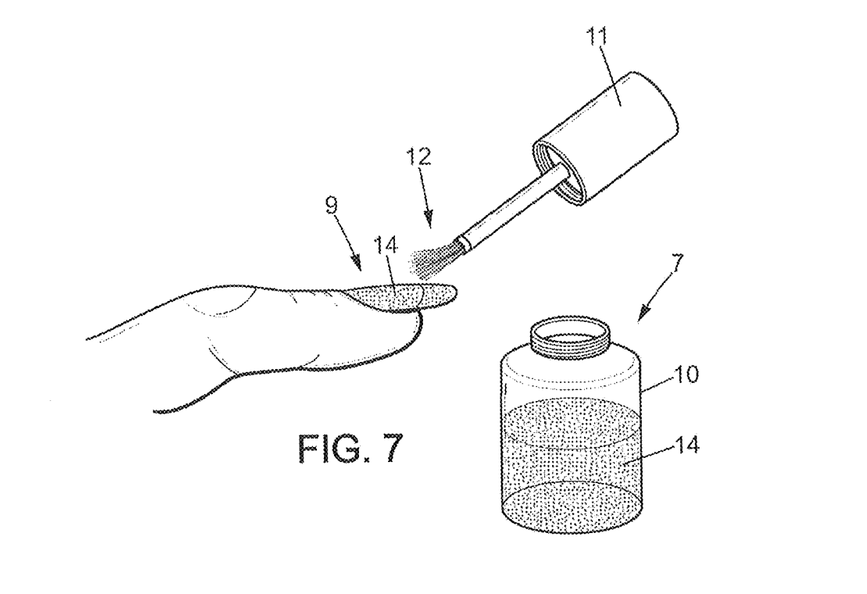
FIG. 7 is another perspective view of a bottle comprising another activator for an article according to the invention, as well an applicator and a finger.
Figure 8:
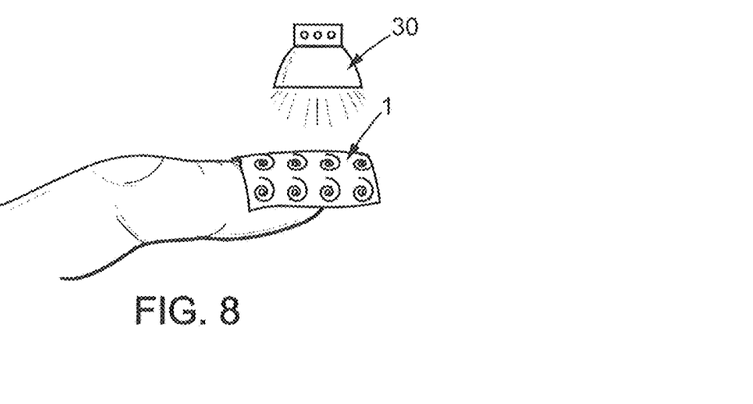
FIG. 8 is a perspective view of a decorative element applied to the fingernail shown in FIG. 7, after application of the activator shown in FIG. 7.
Figure 9:
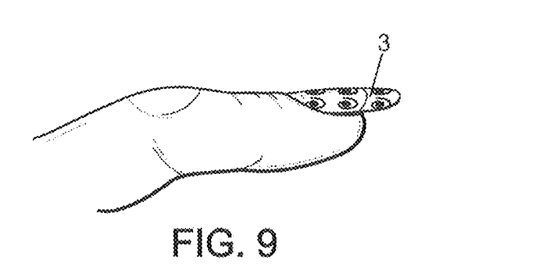
FIG. 9 is another perspective view of the finger shown in FIGS. 7 and 8, after detaching the decorative element.

FIG. 7 shows another activator 7 for inert adhesive according to the invention, packaged in a bottle 10 fitted with a cap 11 equipped with an applicator 12.

In this example, the activator 7 comprises a solvent 14 capable of activating the layer of inert adhesive (see the examples of solvents cited above).

The activator 7 may also be of another type: it may comprise a source of light radiation, such as a source of ultraviolet radiation 30. The activator may also comprise both a source of light radiation 30 and a fluid to be applied to the skin or to a nail.

Finally, the activator may also comprise a heat-contributing source: for example, the activator 7 may comprise a heat lamp. In this case, the heat emitted by the lamp or any heat-emitting source should not exceed 40° C. to avoid burning the skin or the nail and to be bearable by the person applying the decorative element to his or her skin or nail.

It is also conceivable that the activator is pressure exerted on the article, said pressure bursting capsules contained in the layer of inert adhesive, the capsules containing an adhesive fluid.

It is also conceivable that the activator is a cold-contributing source: the supply of cold (application of a chilled fluid, for example) to the adhesive activates the adhesive upon contact.

These embodiments of articles will now be described with reference to FIGS. 3 to 14, illustrating three embodiments of articles according to the invention and three methods of implementation according to the invention.

FIGS. 3 to 6 show a first example of an article according to the invention, in which the activator is fluid and is contained in a bottle 10.

The activator 7, in fluid form, comprises one component of a two-component adhesive. The layer of inert adhesive 6 comprises the complementary component for the component comprised in the activator so that the adhesive is activated.

To apply the decorative element 1 on a fingernail 9, or on an eyelid 13 (or on any other part of the human body), first the activator 7 is applied to the entire surface of the nail 9 (FIG. 3) or to the entire eyelid 13, both moving and unmoving, of a human eye, using the applicator 12 integral with the cap 11.

Without waiting for the activator to dry/evaporate, the decorative element 1 is applied to the nail 9 or eyelid 13 by placing the layer of inert adhesive 6 of the decorative element 1 directly on the surface coated with activator 7 in fluid 8 form.

We wait a predetermined time (a few seconds), the time required for the activator 7 to activate the adhesive 8.

Then the decorative element 1 is carefully removed.

The entire surface of the decorative element in contact with the activator 7 then detaches from the carrier film 5, since the adhesive layer 6 has become active and has a stronger adhesion than the adhesion holding the decorative layer 2 on the support film 5.

Figure 5:
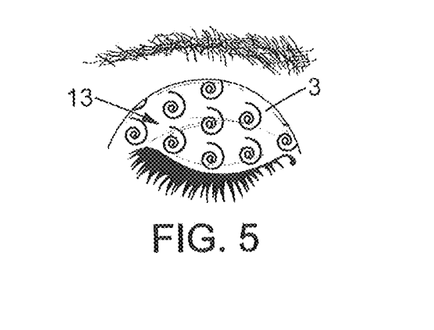
FIG. 5 is a front view of the eyelid shown in FIG. 4, on which a decoration has been applied.
Figure 6:
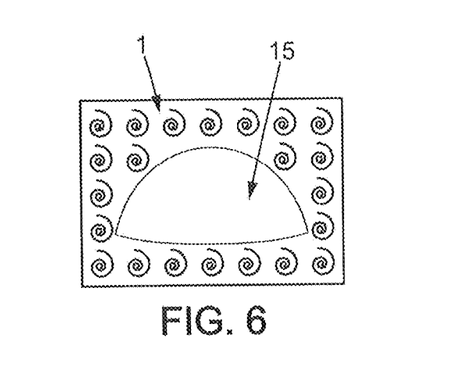
FIG. 6 is a front view of a decorative element after application of the decoration on the eyelid.

Thus, after removing the decorative element 1, an empty shape 15 is observed in the decorative layer 2 of the element 1 which exactly corresponds to the shape of the decoration 2 created on the nail 9 or eyelid 13 (FIG. 5).

FIGS. 7 to 10 show a second example of an article according to the invention, in which the activator is fluid and is contained in a bottle 10.

The activator 7 is a solvent for the layer of inert adhesive 6 of the decorative element (the solvent may be composed of a single product or of a blend of compounds).

Similarly to the previous example, the activator 7 in the form of a solvent 14 is applied over the entire surface of a nail 9 using the brush applicator 12 that is integral to the cap 11 (FIG. 7).

Next, the decorative element is applied to the nail by placing the layer of inert adhesive 6 on the activator 7.

After a predetermined wait time (a few seconds) or immediately (depending on the nature of the adhesive of the activator), the decorative element is detached: the entire surface of the decorative layer 2, integral with the layer of adhesive 6 brought into contact with the solvent 14, remains adhered to the nail (FIG. 9), while the portion of the decorative layer 2, integral to the layer of inert adhesive 6 that has not been placed in contact with the activator, remains bonded to the support film 5.

Figure 10:
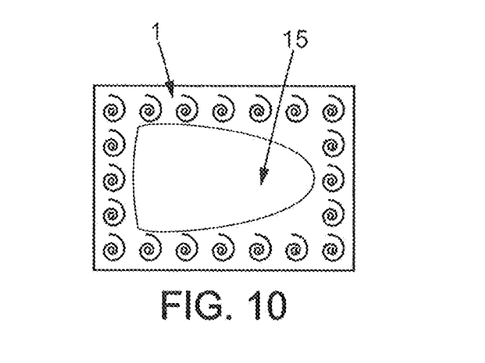
FIG. 10 is a front view of a decorative element after the decoration has been applied on the nail.

As in the previous example, there is a resulting empty space 15 without decoration in the decorative element 1 after removal of the decorative element 1 from the nail 9 (FIG. 10).

An alternative method and article according to the invention could also be provided: instead of a layer of inert adhesive 6 which can be activated by a solvent 14, one could provide a layer of inert adhesive 6 which can be activated by ultraviolet radiation 30 (see FIG. 8): to do this, one can simply apply a particular activator 7 to the nail, which only activates the layer of inert adhesive 6 in contact with it, when in the presence of ultraviolet radiation 30.

A solution could also be provided in which only ultraviolet radiation activates the inert adhesive component, while remaining within the scope of the invention.

A solution could also be provided in which polymer-type adhesive is activated by infrared radiation.

FIGS. 11 to 14 show yet another example of a method according to the invention, making use of another article according to the invention.

In this example, the activator 7 comprises a stamp 16 which is in the form of a pad with a gripping handle 17 on the side opposite an application face 18 bearing a raised pattern 19 (the letter D in the illustrated example but it could be any other pattern). The activator 7 also comprises an open case 20 containing a sponge 21 saturated with an activation fluid 22.

Figure 11:
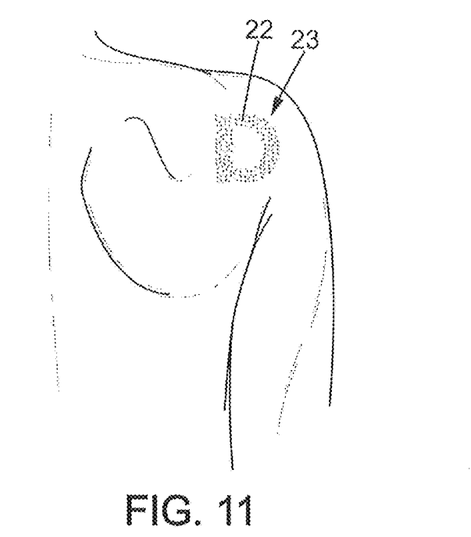
FIG. 11 is a front view of a rear shoulder to which a letter-shaped decoration has been applied.

FIG. 11 shows a shoulder to which the activation fluid is applied using the stamp 16. To do this, the raised letter 19 is pressed against the sponge 22 of the housing 20 and thus saturated with activation fluid 22. Then, the raised letter 19 is pressed onto the surface of the skin of the shoulder 23 (FIG. 11).

Figure 13:
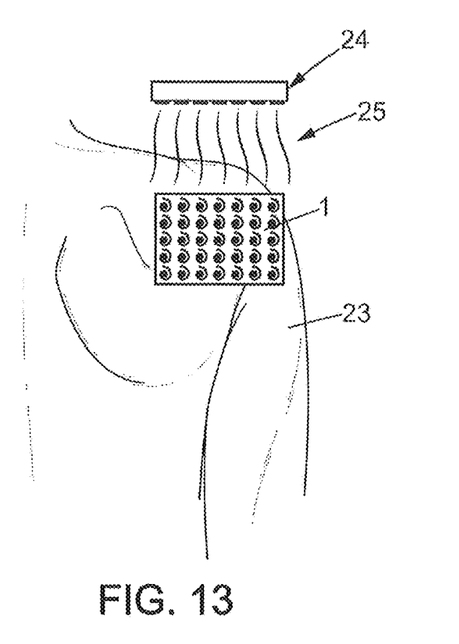
FIG. 13 is a front view of a shoulder to which is applied the decorative element which is exposed to a heat supply.

Then, as shown in FIG. 13, the decorative element 1 is placed against the shoulder 23, with the layer of inert adhesive 6 of the decorative member 1 pressed against the activation fluid 22 previously applied to the shoulder 23.

The activation fluid 22 has the characteristic of only activating the inert adhesive under the effect of heat.

This is why FIG. 13 shows a heat lamp 24 emitting heat 25 toward the decorative element 1 applied to the shoulder 23, on the surface covered with activation fluid.

The temperature of the heat 25 emitted towards the shoulder 23 is between 25 and 40° C., to avoid discomfort for the person receiving the decorative element and to prevent burning the skin.

Figure 14:
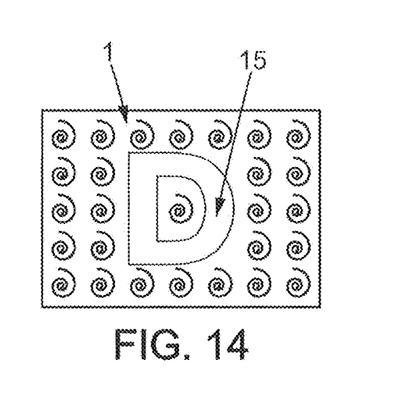
FIG. 14 is a front view of a decorative element after application of the decoration to the shoulder.

Pressure may also be applied to the decorative element to encourage adhesion of the decoration to the skin (or nail). After a predetermined time (a few seconds) or immediately (depending on the nature of the adhesive and of the activator, in particular), the decorative element 1 is detached: only the portion of the decorative layer 2 integral with the adhesive layer 6 that has been in contact with the activator adheres to the skin of the shoulder 23. Thus, a decoration 2 in the shape of the letter D remains on the shoulder 23 (shape of the letter created using the stamp). The decorative element 1, after removal, has an empty space 15 corresponding to the negative of the D-shaped decoration bonded to the shoulder 23.

From the above description, one can understand how the invention enables creating precise decorations 2 on a person's skin or nails using a decorative element of a shape that is not defined beforehand.

It is also understood that due to the design of the decorative element, comprising a combination of decorative layers and compatible inert adhesive, one can create new decorative effects through the use of decorative layers providing effects which cannot be easily obtained otherwise. Thus, the invention allows creating precise and original decorations such as the illusion of a shimmering decoration.

Another solution according to the invention could provide a support layer porous to the solvent, thereby facilitating the drying of the adhesive.

The invention claimed is:

1. An article for decorating a person's skin or nail, comprising an activator which is tolerated by a person's skin or nail and a decorative element to be applied to the skin or to at least one nail of a person, said decorative element comprising:
   a decoration to be transferred at least partially to the person's skin or nail, said decoration comprising at least one decorative layer having a first outer surface and a second outer surface,
   a support film supporting said decoration, said support film being removably attached to the first outer surface of said decorative layer, a layer of inert adhesive, applied to the second outer surface of said decorative layer, said activator being able to activate said layer of inert adhesive, wherein the activator comprises a component that is fluid, pasty, semi-pasty, solid or powdery, which is adapted to be applied to the skin or to at least one nail of a person so that only a surface of the decorative layer in contact with the activator on the skin or on the at least one nail of the person is transferred from the support film to the skin or the at least one nail of the person.

2. The article according to claim 1, wherein the fluid component is a solvent for said inert adhesive.

3. The article according to claim 2, wherein said solvent comprises at least one solvent among: water, alcohol, acetate, or acetone.

4. The article according to claim 1, wherein the layer of inert adhesive comprises a first component of a two-component adhesive, and wherein the fluid component comprises a second component of said two-component adhesive.

5. The article according to claim 1, comprising an applicator for a fluid, semi-fluid, or solid component.

6. The article according to claim 1, wherein the activator comprises a source of light radiation, preferably ultraviolet radiation.

7. A method for the at least partial transfer of a decoration of a decorative element of the article according to claim 6, comprising the following steps:

applying said decorative element to the skin or to the nail by placing the layer of inert adhesive of the decorative element directly on the skin or nail, exposing the decorative element, positioned on the skin or on a nail, to radiation, waiting a predetermined time for activation of the adhesive, removing the decorative element.

8. The method according to claim 7, wherein the radiation is thermal or light radiation.

9. The article according to claim 1, wherein the activator comprises a heat-contributing source.

10. The article according to claim 1, wherein the activator comprises a cold-contributing source.

11. The article according to claim 1, wherein the activator is a pressure source.

12. The article according to claim 1, wherein said layer of inert adhesive comprises a plurality of sublayers of products superimposed on one another.

13. The article according to claim 1, wherein said decoration is a sheet having a surface area measuring at least 0.5 cm2.

14. The article according to claim 1, wherein said decoration is a sheet having a surface area measuring between 0.5 cm2 and 100 cm2.

15. The article according to claim 1, wherein said decoration is a sheet having a pattern in two or three dimensions, or providing an effect imitating three dimensions, or imitating fabric, a particle effect, a metal, or a decoration providing optical illusions according to its orientation relative to a light source.

16. The article according to claim 1, wherein the support film of said decorative layer is a transparent film.

17. The article according to claim 1, comprising a removable protective film at least partially covering said layer of inert adhesive.

18. A method for the at least partial transfer of a decoration of a decorative element of the article according to claim 1, comprising the steps of:

applying, to the skin or to a nail, the fluid, pasty, semi-pasty, solid or powdery component comprised in the activator for said layer of inert adhesive, applying said decorative element to the skin or to the nail, by placing the layer of inert adhesive of the decorative element on the fluid component applied to the skin or the nail, waiting a predetermined time for activation of the adhesive, removing the decorative element.

19. The method according to claim 18, wherein the activator comprises a source of light radiation, preferably ultraviolet radiation, and the application of the fluid component is effected by means of an applicator.

20. The method according to claim 18, wherein the activator comprises a source of ultraviolet radiation, said method comprising an additional step wherein, after the step of applying said decorative element to the skin or to the nail, the decorative element is exposed to ultraviolet radiation for a predetermined time.

21. The method according to claim 18, wherein, after the step of applying the decorative element to the skin or to a nail, the decorative element is exposed to a source of heat for a predetermined time.

22. The method according to claim 21, wherein the source of heat produces heat of a temperature between 25° C. and 40° C.

23. The method according to claim 18, further comprising a step of pressing the decorative element onto the skin or onto a nail.

* * * * *